(12) United States Patent
Whelan et al.

(10) Patent No.: US 7,042,392 B2
(45) Date of Patent: May 9, 2006

(54) GPS ACCESS SYSTEM AND METHOD

(75) Inventors: David A. Whelan, Newport Coast, CA (US); Gregory M. Gutt, Leesburg, VA (US); Barton G. Ferrell, Troy, IL (US); Clark Cohen, Washington, DC (US)

(73) Assignee: The Boeing Company, Chicago, IL (US)

( * ) Notice: Subject to any disclaimer, the term of this patent is extended or adjusted under 35 U.S.C. 154(b) by 22 days.

(21) Appl. No.: 10/720,736

(22) Filed: Nov. 24, 2003

(65) Prior Publication Data

US 2005/0004758 A1 Jan. 6, 2005

Related U.S. Application Data

(60) Provisional application No. 60/475,205, filed on May 30, 2003.

(51) Int. Cl.
*H04B 7/185* (2006.01)
*G01S 5/02* (2006.01)

(52) U.S. Cl. .............................. 342/357.15; 342/357.16
(58) Field of Classification Search ........... 342/357.05, 342/357.06, 357.15, 357.16; 701/207, 213, 701/215
See application file for complete search history.

(56) References Cited

U.S. PATENT DOCUMENTS

| | | | | |
|---|---|---|---|---|
| 5,402,347 | A | * 3/1995 | McBurney et al. | ......... 701/213 |
| 5,572,218 | A | 11/1996 | Cohen et al. | |
| 5,812,961 | A | 9/1998 | Enge et al. | |
| 6,052,647 | A | 4/2000 | Parkinson et al. | |
| 6,133,874 | A | * 10/2000 | Krasner | ............... 342/357.15 |
| 6,373,432 | B1 | 4/2002 | Rabinowitz et al. | |
| 6,466,958 | B1 | * 10/2002 | Van Wechel et al. | ....... 708/422 |
| 6,856,282 | B1 | * 2/2005 | Mauro et al. | .......... 342/357.15 |

\* cited by examiner

*Primary Examiner*—Dao Phan
(74) *Attorney, Agent, or Firm*—Black Lowe & Graham PLLC

(57) ABSTRACT

This invention describes a means for acquiring GPS P/Y code under jamming conditions. It improves jam resistance by augmenting a component of the GPS signal with one from a different satellite system, such as a low earth orbiting (LEO) satellite. The preferred embodiment of this invention employs the Iridium LEO satellite constellation broadcasting in a 10 MHz wide band about 1,621 MHz. A low-cost, integrated Iridium receiver coupled to the GPS receiver employs a single antenna that is capable of receiving both the GPS and Iridium signals together.

33 Claims, 4 Drawing Sheets

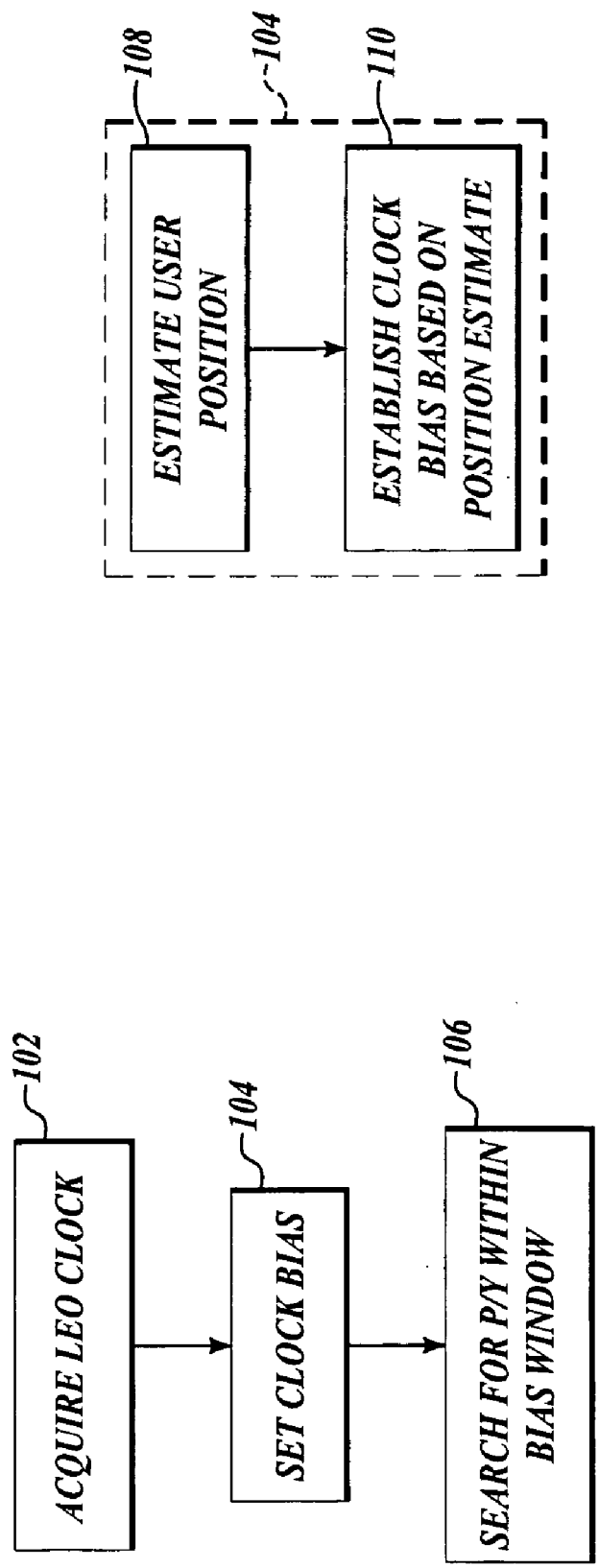

GPS ACCESS SYSTEM AND METHOD

This application claims the benefit of Provisional Patent Application Ser. No. 60/475,205 filed on May 30, 2003.

FIELD OF THE INVENTION

This invention relates generally to global positioning systems and, more specifically, to systems for accessing GPS signals under jamming conditions.

BACKGROUND OF THE INVENTION

GPS, or Global Positioning System, is funded by and controlled by the U.S. Department of Defense (DOD). While there are many thousands of civil users of GPS world-wide, the system was designed for and is operated by the U.S. military. GPS provides specially coded satellite signals that can be processed in a GPS receiver, enabling the receiver to compute position, velocity, and time. Four GPS satellite signals are used to compute positions in three dimensions and the time offset in the receiver clock. The GPS satellites transmit two microwave carrier signals. The L1 frequency (1575.42 MHz) carries the navigation message and the Satellite Positioning Service (SPS) code signals. The L2 frequency (1227.60 MHz) is used to measure the ionospheric delay by Precise Positioning System (PPS) equipped receivers.

Three binary codes shift the L1 or L2 carrier phase. The C/A Code (Coarse Acquisition) modulates the L1 carrier phase. The C/A code is a repeating 1 MHz Pseudo Random Noise (PRN) Code. This code modulates the L1 carrier signal, spreading the spectrum over a 1 MHz bandwidth. The C/A code repeats every 1023 bits (one millisecond). Each satellite has a different PRN C/A code, and GPS satellites are often identified by their PRN number, the unique identifier for each pseudo-random-noise code. The C/A code that modulates the L1 carrier is the basis for the civil SPS.

Authorized users with cryptographic equipment and keys and specially equipped receivers use the Precise Positioning System, or PPS. Authorized users include U.S. and allied military, certain U.S. Government agencies, and selected civil users specifically approved by the U.S. Government. In the PPS, the P-Code (Precise) modulates both the L1 and L2 carrier phases. The P-Code is a very long (seven days) 10 MHz PRN code. In the Anti-Spoofing (AS) mode of operation, the P-Code is encrypted into the Y-Code. The encrypted Y-Code requires a classified AS Module for each receiver channel and is for use only by authorized users with cryptographic keys. The P/Y Code is the basis for the PPS.

A Navigation Message also modulates the L1-C/A code signal. The Navigation Message is a 50 Hz signal consisting of data bits that describe the GPS satellite orbits, clock corrections, and other system parameters. The GPS Navigation Message consists of time-tagged data bits marking the time of transmission of each subframe at the time they are transmitted by the SV. A data bit frame consists of 1500 bits divided into five 300-bit subframes. A data frame is transmitted every thirty seconds. Three six-second subframes contain orbital and clock data. Satellite Vehicle (SV) Clock corrections are sent in subframe one and precise satellite orbital data sets (ephemeris data parameters) for the transmitting SV are sent in subframes two and three. Subframes four and five are used to transmit different pages of system data. An entire set of twenty-five frames (125 subframes) makes up the complete Navigation Message that is sent over a 12.5 minute period.

Ephemeris data parameters describe SV orbits for short sections of the satellite orbits. Normally, a receiver gathers new ephemeris data each hour, but can use old data for up to four hours without much error. The ephemeris parameters are used with an algorithm that computes the SV position for any time within the period of the orbit described by the ephemeris parameter set.

The C/A code is broadcast at 1,575.42 MHz in a 2.046 MHz wide band (complete null to null), and is used for civilian operations and for initial acquisition in military operations. The P/Y code is a wider-band signal spanning 20.46 MHz that provides 10 times higher ranging precision than C/A code commensurate with its higher chipping rate. Often, C/A code is the first casualty of jamming. The 1.023 MHz chipping rate of the C/A code provides some protection, but the 10.23 MHz chipping rate of the P/Y code offers an additional 10 dB of J/S protection. If the jamming is known to be narrow band and to originate within the C/A code frequency band so as to deny enemy use of the C/A code signal component, then even more protection is available by notch filtering the center 2 MHz of the P/Y code input to the receiver.

The typical acquisition sequence for a military receiver is to lock on and acquire with the C/A code to establish an approximate timing fix. Since the C/A code repeats every millisecond, it is usually possible to search through all possible code phases within a second or so. Once the GPS receiver clock is known, the receiver can acquire the Y code—the secure version of the P/Y code.

Unlike the C/A code, the Y code does not have the repeating quality that would make it easy to acquire. Therefore, the user receiver must have nearly exact knowledge of time before it is possible to lock onto the military Y code signal. In other words, although it may be possible to track the Y code in jammed conditions due to its wider spreading characteristics, under ordinary circumstances it may not be possible to acquire Y code because the C/A code is jammed.

Several previous solutions to the timing initialization problem have been developed and fielded, although they each suffer significant shortfalls that prevent them from realizing the full potential of GPS Y code.

The first is brute force Y code search schemes that pool all onboard hardware resources onto a single satellite in an attempt to expand the search window of unknown GPS time. This technique works well if a GPS receiver has been off for only a short time and the satellite that it selects for searching does not happen to be blocked. But under stressed conditions, it is not assured that it will lock on at all if its clock is too far off or if its search algorithm just happens to be out of synchronization with the prevailing environmental conditions. There is no graceful degradation in this case—only failure to lock.

Another method is to combine a receiver with an accurate time standard, such as an atomic clock. While this may be practical under some circumstances, this method subjects the overall system to additional costs or operational constraints. Rugged atomic standards generally cost more than the GPS receiver itself. For ground operations it is possible to hook up GPS receiver field equipment that utilizes an atomic clock that accompanies a GPS receiver or a local time-transfer facility that operates by physically interfacing a handheld GPS receiver to the timing source or some intermediate device coupled electronically to an atomic clock. Such arrangements, while technically feasible, impose unwarranted operational burdens on troops in a hostile environment. It may be impractical or cumbersome for ground troops or aircraft to take the additional step of physically connecting to an initialization device in an urgent situation or to have to rely on the assumption of ubiquitous ground support infrastructure.

Prior systems have used LEO satellite systems to augment GPS positioning. For example, U.S. Pat. No. 5,812,961 (which is incorporated by reference) describes the use of the angular velocity and position of a LEO satellite to calculate a location vector for a user. The location vector is derived by obtaining and combining user-reference carrier phases for both LEO and GPS satellites. But the '961 patent does not suggest the use of a LEO satellite to assist in acquiring a GPS clock.

What is needed is a low-cost, stand-alone GPS set that can initialize instantaneously anywhere in the world under C/A code jamming conditions.

SUMMARY OF THE INVENTION

This invention describes a means for acquiring GPS P/Y code under jamming conditions. It improves jam resistance by augmenting a component of the GPS signal with one from a different satellite system, such as a low earth orbiting (LEO) satellite. The preferred embodiment of this invention employs the Iridium LEO satellite constellation broadcasting in a 10 MHz wide band about 1,621 MHz. A low-cost, integrated Iridium receiver coupled to the GPS receiver employs a single antenna that is capable of receiving both the GPS and Iridium signals together.

BRIEF DESCRIPTION OF THE DRAWINGS

The preferred and alternative embodiments of the present invention are described in detail below with reference to the following drawings.

FIG. 4 is a flow diagram of a preferred method for acquiring a GPS P/Y clock; and FIG. 5 is a flow diagram of an alternate method for acquiring a GPS P/Y clock.

DETAILED DESCRIPTION OF THE INVENTION

Figure 1:
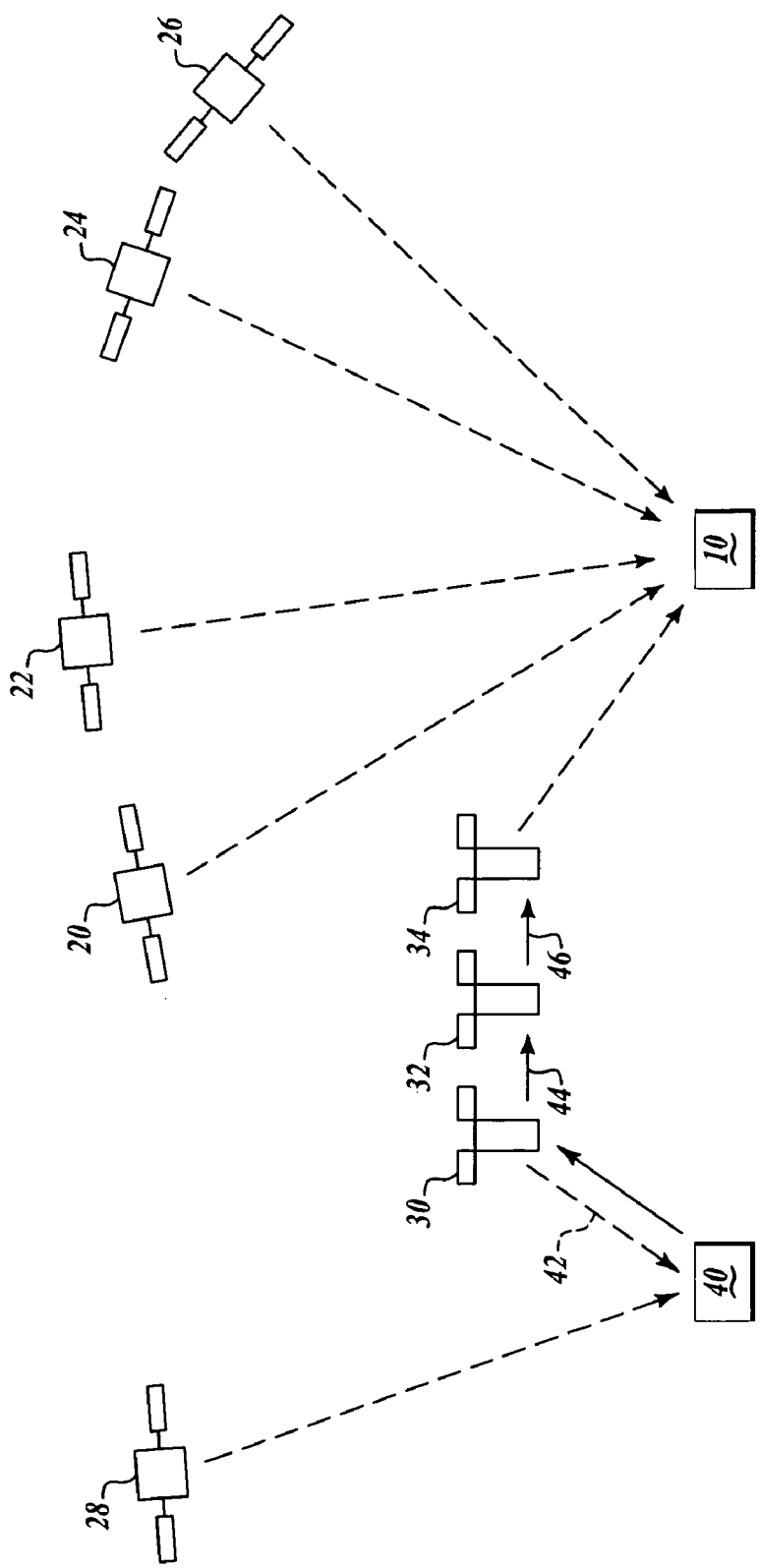
FIG. 1 is a block diagram of a preferred GPS system augmented with LEO satellites.

FIG. 1 shows a block diagram of the preferred embodiment of the system. The user receiver 10 is capable of completely stand alone operation. It contains a military Y-code GPS receiver coupled to an Iridium data receiver. It receives signals from four or more GPS satellites 20–28 and one or more Iridium satellites 20–34 orbiting above. These signals are sufficient to initialize the Y code positioning function of the GPS receiver.

GPS enables any user to measure GPS time anywhere in the world to within substantially less than one microsecond. At the Iridium gateways 40, ground monitors measure Iridium satellite time by measurements of the Iridium downlink 42. The clocks on each Iridium satellite 30–34 are steered to within ±11 microseconds of the ground reference worst case, although the operational values are typically much better. Therefore, the Iridium ground monitor network can measure the clock offset of each Iridium satellite with respect to GPS time to within a few microseconds. If any satellite clock error exceeds the worst-case threshold, it will be flagged as unhealthy. In practice the time monitoring serves only as an integrity check because user equipment position error will dominate all other error sources.

Because the Iridium clock is so close to the GPS clock, if a user is able to obtain the Iridium clock the user will be within a few microseconds of the GPS clock as well. Thus, starting with the Iridium clock greatly reduces the time required to acquire the GPS P/Y code. Once the system acquires the Iridium (or other LEO) clock, it will search for and acquire the GPS clock using a method such as those described below.

The Iridium control segment also carries out regular orbit determination for each spacecraft. The controlling gateway embeds an ephemeris of each satellite in a predefined broadcast block called a "visit message" which is directed through the Iridium network via crosslinks 44, 46 to the appropriate satellite. All Iridium receivers picking up the Iridium satellite signal can then download the ephemeris.

Figure 2:
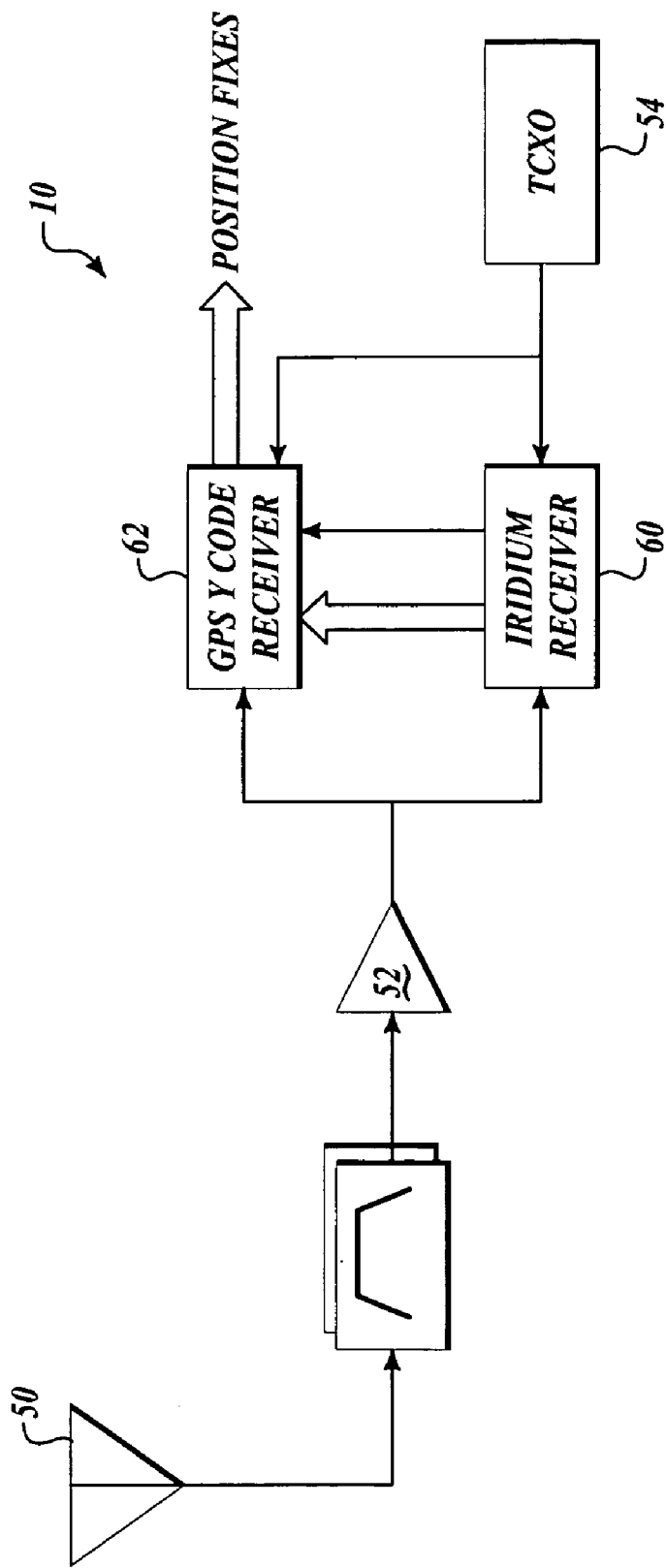
FIG. 2 is a block diagram of a preferred GPS receiver.

FIG. 2 shows the basic architecture for the user receiver 10, which is equipped to receive both GPS and Iridium signals. Note that the invention should not be limited to Iridium or any other particular satellite systems. Rather, the system will work equally well by using a receiver for any other satellite system in which the time offset between GPS and the other satellite system is relatively small and maintained.

In the form of FIG. 2, a dual band antenna 50 and preamp 52 permit both the L1 and L2 GPS signals to pass along with the Iridium signal, which is close to the L1 signal frequency. The Iridium and GPS receivers are tied together with a common clock 54. The clock is a temperature compensated crystal oscillator.

The Iridium receiver 60 outputs a pulse per second signal generated from the common clock. When the Iridium receiver 60 calculates an estimate of the receiver clock bias, it conveys this estimate to the GPS receiver 62 via the data transmission path.

Figure 3:
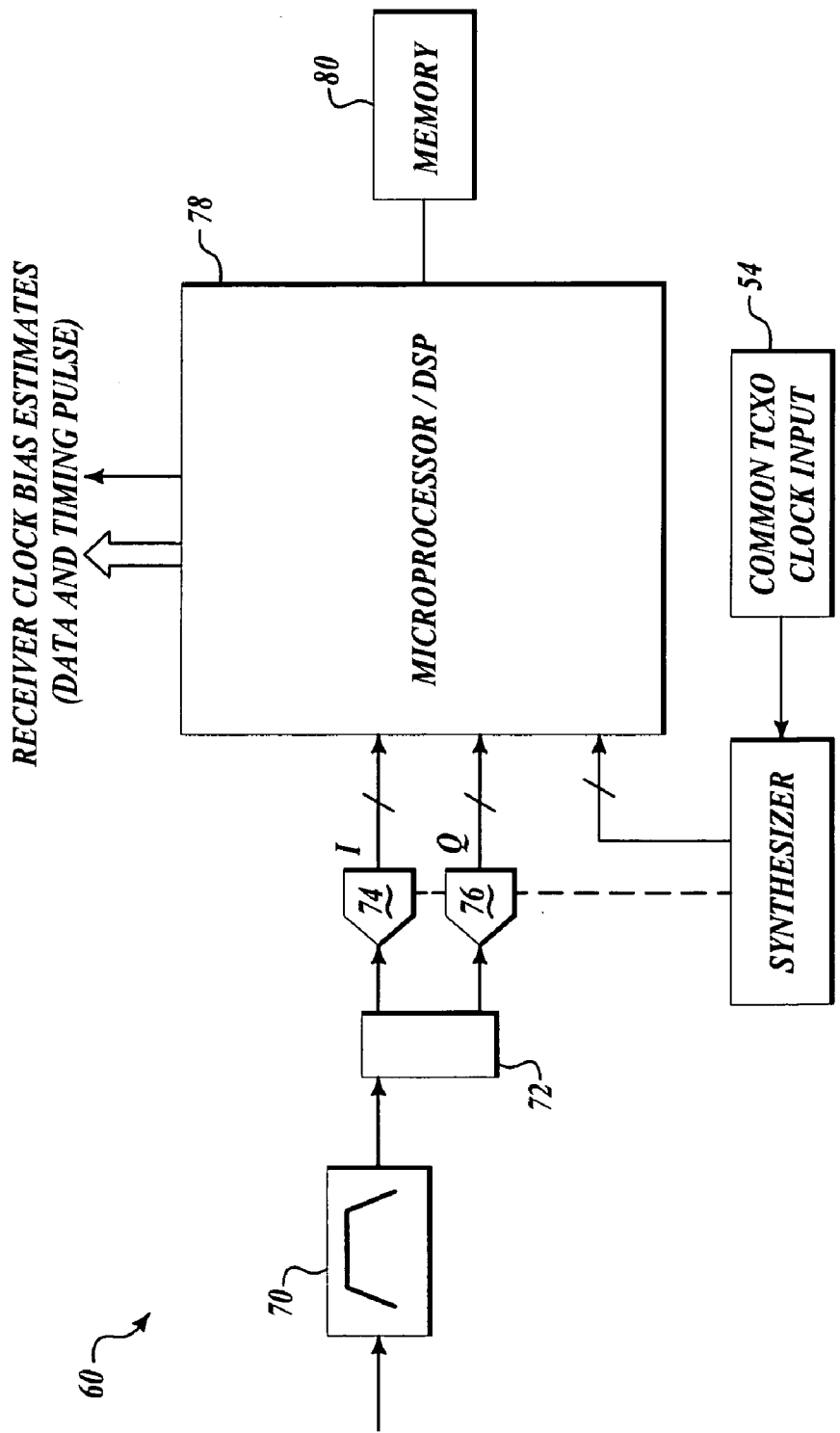
FIG. 3 is a block diagram of a preferred receiver configured for use with the augmented GPS and LEO system.

FIG. 3 shows the preferred embodiment of the Iridium receiver 60. Existing Iridium receivers can be obtained and used for this purpose. Nonetheless, the preferred form of this invention employs software for much of the Iridium receiver 60 so as to make it both low cost and easy to maintain and upgrade.

The front end of the receiver includes a bandpass filter 70. The filter 70 has a 10 MHz passband at 1,621 MHz with a steep cutoff, therefore requiring it to be a high Q filter. New technologies allow this sharp filtering to be done at this frequency. The sharp filtering rejects out-of-band interference, such as nearby cellular telephones. An example of the electrical components suitable for this purpose is the specialized RF chip pair contained in IBM GPS receiver IBM43GAENGP0001. This receiver contains an integrated SiGe chip which carries out the bandpass, automatic gain control (AGC), and direct RF sampling functions using 2-bit quantization. Schematically, these functions are illustrated in FIG. 3 as the signal travels from the bandpass filter 70, then is separated into inphase and quadrature components via the hybrid coupler 72. The component signals are passed to inphase and quadrature A/D converters 74, 76. One implementation would be to translate the equivalent design up by 46 MHz to the Iridium band. However, it is not critical that direct downconversion be used. It is also possible to employ a traditional quadrature downconversion scheme.

The A/D converters 74, 76 sample the incoming inphase and quadrature signals at 40 MHz. The output is fed directly into a digital signal processor (DSP) 78 (preferably a TMS 320 DSP) which can then process sections of the data to lock onto the Iridium signal, calculate signal phasing and phase rate, and extract the broadcast bits containing the ephemeris information for the Iridium satellite. A memory 80 is also provided to store data and computer programming instructions for processing. The memory 80 may take any of a variety of forms, such as EEPROM chips or other electromagnetic or optical storage devices.

As noted above, the ephemeris data for the Iridium satellite will include information such as the location of the individual satellites within the constellation at various points in time and other information that can be used by the DSP 78 to accurately obtain the Iridium clock and therefore the GPS clock. Once found, this information is passed to the GPS Y code receiver 62, which uses the initial clock bias estimate from the Iridium receiver to more quickly acquire the GPS Y code signal.

There are several alternative methods in which the GPS Y code can be obtained in accordance with this invention. Three such alternatives are described below.

The first alternative simply assumes a likely clock error between GPS and Iridium, then searches within that assumed error space for the GPS Y code. Thus, with reference to FIG. 4, the receiver first acquires the Iridium or other SV clock 102. After acquiring the Iridium clock, the system establishes a bias between the received Iridium clock and GPS Y. While the clock bias is "set" as shown in FIG. 4, the simplest embodiment uses a preset bias based on the expected bias. Accordingly, in a simple embodiment the bias is not established after the Iridium acquisition, but rather can be set at any time. The actual bias would likely differ from the set bias, and depends on factors including the propagation delay from the Iridium satellite and the actual GPS/Iridium offset. In the simplest form, estimates of these factors are used to determine the preset bias.

For any ranging source, the relationship between pseudorange, $\rho$, and distance to the satellite, d, speed of light, c, and receiver clock bias, $\tau$, is $$\rho = \frac{d}{c} + \tau$$

In this simplified case, the DSP can solve this equation for clock bias. It is simplest by assuming that the propagation delay from an Iridium satellite ranges from 3–9 milliseconds and hardwiring a mid-range value of 6 milliseconds. The resulting error in range to the Iridium satellite would be ±3 milliseconds, creating an equivalent error in receiver clock bias.

Once the Iridium clock has been acquired and the expected clock bias has been established, the next step is to search for the P/Y clock within the established bias window 106. Assuming that there is good a priori knowledge of the GPS/Iridium receiver oscillator offset, there are roughly 60,000 code bins to search at roughly 50 bins per second under worst case jamming conditions. This number increases to 500 bins per second if additional parallel processing is used. The worst case search time under worst case jamming conditions would then be two minutes. Any additional receiver clock frequency uncertainty will drive up this acquisition time proportionally. Therefore, in the preferred embodiment, other techniques are used to reduce the uncertainties.

A second method begins with an approximate fix on user position, which will help to reduce the likely range of clock bias. If an approximate position fix of the user can be established, then both the actual range and the range rate can be determined, yielding more accurate receiver clock bias and bias rate estimates. Accordingly, the process of setting the clock bias (block 104 in FIGS. 4 and 5) involves a first step of estimating user position block 108, followed by establishing a clock bias based on the user position estimate, block 110.

In this method, the preferred way to initialize the user position is by mapping it through its 48 antenna beams. Each Iridium satellite has phased array antennas that are used to create distinct cells projected on the Earth's surface. By determining which beam the user is in, a rough estimate of position can be evaluating by finding where the beam axis intersects the Earth, i.e., solving the following equation for d:

$$|x+A^T\hat{r}_k d|=\overline{R}_E$$

The vector x is the instantaneous spacecraft position calculated from the ephemeris, A is the spacecraft inertial attitude matrix assumed to be tied to the local-horizontal, along-track frame, $\hat{r}_k$ is the unit vector in the spacecraft body frame for the kth antenna beam, and $\overline{R}_E$ is a mean radius employed as an approximation for the oblate Earth.

Given that there are 48 antenna beams, the search space in both time (and frequency) fall into roughly ±3.5 bins (half the square root of 48). These approximations are sufficient to bound the receiver clock bias to within less than a millisecond (±10,000 code bins). Therefore, the best case performance that can be obtained assuming parallel search processing in the GPS receiver is a lockup time to Y code of under 40 seconds.

If the receiver must lock up to Y code in a jamming environment without ever having been able to establish its oscillator offset—an unusual condition—then a rapid lockup must rely on additional information available from range rate. The clock bias rate estimate is obtained by taking the derivative of the pseudorange equation.

$$\dot{\rho} = \frac{\dot{d}}{c} + \dot{\tau}$$

From the uncertainty in position derived from the antenna beam pattern, the oscillator frequency search width spans roughly ±6 ppm. A frequency search bin width of 2 ppm is normally sufficient, but assuming worst-case jamming conditions, it is most conservative to assume a search bin of 0.1 ppm. This would result in a 40 minute acquisition worst case. This time is too long to be practicable in the field. Therefore, the following method should be used if there is any oscillator frequency uncertainty.

In a third method, it is possible to even further reduce the search space by refining the estimate of user position using the Doppler profile of the Iridium satellite, not unlike the operation of a Transit satellite positioning system. The Transit satellite system was developed for updating the inertial navigation systems on board the Polaris submarines. It operates on the principle of the measurement of the Doppler Shift. As a single spacecraft travels overhead the user measures the Doppler shift over a fifteen minute period by receiving satellite timing marks and satellite orbital information on two separate frequencies, 149.99 and 399.97 MHz. These signals are corrected for ionospheric refraction and the information is then fed into the user's navigation system. Similarly, the Doppler shift of the Iridium satellite can be tracked in order to determine user position.

In this method, the Iridium receiver monitors the ranging signals received from an Iridium satellite over time. By determining the Doppler shift that occurs as the satellite passes overhead, the receiver can obtain a fairly precise determination of the user position. Thus, with reference to FIG. 5, the estimate of user position at block 108 is performed with reference to the Doppler profile of the Iridium satellite.

Additional methods may also be used to obtain an initial position fix. In an alternate version of this third method, several LEO satellites can be used to obtain a highly accurate position fix. U.S. Pat. No. 6,373,432 (which is incorporated by reference) describes the use of several LEO satellites to calculate a user position based on reference carrier phase information and user carrier phase information derived from a plurality of LEO satellites. Such a system could likewise be used to determine an initial position fix for use in obtaining a GPS Y clock in accordance with this invention.

Structurally, the digital signal processor 78 processes computer programming instructions stored in a memory in order to determine user position. By measuring the Doppler shift over time, the DSP 78 determines user position with respect to the Iridium satellite. Once the position is determined, the receiver clock bias information is passed to the GPS receiver to search for the GPS Y signal.

Because this process takes on the order of a minute to carry out anyway, it is probably easier to employ the preferred embodiment (that is, estimating user position using the Iridium antenna beams) since it will have completed acquisition long before satellite motion begins yielding useful additional information. Nevertheless, in the case where a completely cold start is required under worst-case jamming conditions, refinement using Doppler measurement profiles within a one minute time frame represents the least upper bound on acquisition time.

Once the GPS Y signal is obtained, it may be used in any manner to assist in user positioning. An example of user positioning that can be generated using the GPS system is described in U.S. Pat. No. 5,572,218, which is incorporated by reference. Yet another example is described in U.S. Pat. No. 6,052,647, which is also incorporated by reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for acquiring a first signal transmitted from a first satellite, comprising:
   acquiring a second signal transmitted from a second satellite; and
   searching for the first signal within an expected offset range from the acquired second signal until the first signal is acquired.

2. The method of claim 1, wherein the first satellite and the second satellite are different satellite types, each belonging to a different satellite constellation.

3. The method of claim 2, wherein the second satellite is a low earth orbit satellite.

4. The method of claim 3, wherein the first satellite is a GPS satellite and the first signal comprises a GPS Y code signal.

5. The method of claim 4, wherein the second satellite is an Iridium satellite.

6. The method of claim 5, wherein the expected offset range is a function of propagation delay and a likely clock error between the first signal from the GPS satellite and the second signal from the Iridium satellite.

7. The method of claim 6, wherein the expected offset range is preset.

8. The method of claim 7, wherein the expected offset range is 6 milliseconds.

9. The method of claim 5, further comprising estimating a position of a user with respect to the Iridium satellite.

10. The method of claim 9, wherein the user position is estimated as a function of position within a multiple beam antenna.

11. The method of claim 10, wherein the expected offset range is a function of the user position.

12. The method of claim 9, wherein user position is estimated as a function of a Doppler profile of the Iridium satellite.

13. The method of claim 10, wherein the expected offset range is a function of the user position.

14. A device for acquiring a first signal transmitted from a first satellite, comprising:
   a first receiver configured to acquire the first signal; and
   a second receiver coupled to the first receiver, the second receiver configured to acquire a second signal transmitted from a second satellite and to send to the first receiver an estimate of an offset between the first signal and the second signal;
   whereby the first receiver can acquire the first signal by searching for the first signal within an expected offset range from the acquired second signal until the first signal is acquired.

15. The device of claim 14, further comprising:
   an antenna adapted to receive the first signal and the second signal;
   at least one preamplifier in signal communication with the antenna and at least one of the first receiver or the second receiver to amplify at least one of the first signal or the second signal; and
   a clock coupled to the first receiver and the second receiver.

16. The device of claim 15, wherein the second receiver further comprises a bandpass filter configured to allow the second signal to pass and to reject out of band interference signals.

17. The device of claim 16, wherein the first receiver is a GPS Y code receiver.

18. The device of claim 17, wherein the second receiver is an Iridium satellite receiver.

19. The device of claim 18, wherein the second receiver further comprises;
   a hybrid coupler coupled to the bandpass filter to produce inphase and quadrature signals;
   an inphase analog to digital converter in signal communication with the inphase signal;
   a quadrature analog to digital converter in signal communication with the quadrature signal; and
   a digital signal processor configured to receive the inphase signal and the quadrature signal and to process the signals to acquire the second signal from the Iridium satellite.

20. The device of claim 19, wherein the second signal contains ephemeris information for the Iridium satellite.

21. A device for acquiring a first signal transmitted from a first satellite, comprising:
   a means for acquiring the first signal;
      a means for acquiring a second signal transmitted from a second satellite; and
      a means for estimating an offset between the first signal and the second signal;
      whereby the means for acquiring the first signal searches for the first signal within an expected offset range from the acquired second signal until the first signal is acquired.

22. The method of claim 21, wherein the first satellite and the second satellite are different satellite types, each belonging to a different satellite constellation.

23. The method of claim 22, wherein the second satellite is a low earth orbit satellite.

24. The method of claim 23, wherein the first satellite is a GPS satellite and the first signal comprises a GPS Y code signal.

25. The method of claim 24, wherein the second satellite is an Iridium satellite.

26. The method of claim 27, wherein the expected offset range is a function of propagation delay and a likely clock error between the first signal from the GPS satellite and the second signal from the Iridium satellite.

27. The method of claim 26, wherein the expected offset range is preset.

28. The method of claim 27, wherein the expected offset range is 6 milliseconds.

29. The method of claim 26, further comprising a means for estimating a position of a user with respect to the Iridium satellite.

30. The method of claim 29, wherein the user position is estimated as a function of position within a multiple beam antenna.

31. The method of claim 30, wherein the expected offset range is a function of the user position.

32. The method of claim 29, wherein user position is estimated as a function of a Doppler profile of the Iridium satellite.

33. The method of claim 32, wherein the expected offset range is a function of the user position.

* * * * *